United States Patent [19]

Frost et al.

[11] Patent Number: 5,146,603
[45] Date of Patent: Sep. 8, 1992

[54] COPY-BACK CACHE SYSTEM HAVING A PLURALITY OF CONTEXT TAGS AND SETTING ALL THE CONTEXT TAGS TO A PREDETERMINED VALUE FOR FLUSHING OPERATION THEREOF

[75] Inventors: Adrian R. Frost, Camberley; Karl M. Henson, Windsor, both of Great Britain

[73] Assignee: International Computers Limited, London, England

[21] Appl. No.: 352,393

[22] Filed: May 16, 1989

[30] Foreign Application Priority Data

Jun. 14, 1988 [GB] United Kingdom ............... 8814077

[51] Int. Cl.[5] ............... G06F 12/08; G06F 13/00; G06F 12/12
[52] U.S. Cl. .................... 395/425; 364/243; 364/243.4; 364/243.41; 364/253; 364/254.8; 364/DIG. 1; 395/800
[58] Field of Search ... 364/200 MS File, 900 MS File; 395/425

[56] References Cited

U.S. PATENT DOCUMENTS

| | | | |
|---|---|---|---|
| 4,053,948 | 10/1977 | Hogan et al. | 364/200 |
| 4,086,629 | 4/1978 | Desyllas et al. | 364/200 |
| 4,322,815 | 3/1982 | Broughton | 364/200 |
| 4,426,682 | 1/1984 | Riffe et al. | 364/200 |
| 4,713,755 | 12/1987 | Worley, Jr. et al. | 364/200 |
| 4,714,990 | 12/1987 | Desyllas et al. | 364/200 |
| 4,811,209 | 4/1989 | Rubinstein | 364/200 |
| 4,819,154 | 4/1989 | Stiffler et al. | 364/200 |
| 4,977,498 | 12/1990 | Rastegar et al. | 364/200 |
| 5,025,366 | 6/1991 | Baror et al. | 364/200 |

OTHER PUBLICATIONS

Loo, "Maximize performance by choosing best memory", Computer Design, vol. 26, No. 14, Aug. 1, 1987, pp. 89–94.
Goodman, "Coherency For Multiprocessor Virtual Address Caches", ASPLOS II, Oct. 5–8, 1987, pp. 72–81.

Primary Examiner—Thomas C. Lee
Assistant Examiner—Thomas S. Taylor
Attorney, Agent, or Firm—Lee, Mann, Smith, McWilliams, Sweeney & Ohlson

[57] ABSTRACT

A data memory system includes a main memory and a copy-back cache. Each line of the cache has a context tag, which is compared with a current context number to test whether the line contains the required data. The cache can be flushed simply by resetting all the context tags to a null value, which ensures that the data cannot be accessed. However, it remains physically in the cache, and will eventually be copied back to the main memory when it is about to be overwritten with different data or when the physical address is next used.

5 Claims, 4 Drawing Sheets

COPY-BACK CACHE SYSTEM HAVING A PLURALITY OF CONTEXT TAGS AND SETTING ALL THE CONTEXT TAGS TO A PREDETERMINED VALUE FOR FLUSHING OPERATION THEREOF

BACKGROUND TO THE INVENTION

This invention relates to data memory systems and, more specifically, is concerned with a data memory system including a copy-back cache.

It is well known to provide a two-level memory system, consisting of a main memory and a smaller, faster cache memory. In operation, the cache is arranged to hold copies of data items from the main memory that are currently in use, or are likely to be required in the near future, so that these items can be accessed rapidly, without the delay of a main memory access. Such memories are described, for example, in "Cache Memories" by A. J. Smith, ACM Computing Surveys, September 1982, page 473.

In such a memory system, when a data item in the cache is written to (updated), the new value must also eventually be written into the main memory, so as to keep it up-to-date. There are two strategies normally used for this, referred to as write-through and copy-back. In the write-through strategy, whenever an item is updated in the cache, the updated value is immediately written to the main memory. In the copy-back strategy, on the other hand, the main memory is updated at some later time, usually only when the modified data item is about to be cast out of the cache to make room for another item. This has the advantage that it reduces the number of accesses to main memory. The present invention is concerned only with caches that use this copy-back strategy.

It is also known in virtual caches to tag the data items in a cache with context numbers, to indicate which of a number of different processes or programs the data item at a particular virtual address is associated with. Whenever a data item is loaded into the cache, it is tagged with the current context number, i.e. the context number of the program that is currently being executed. Whenever a data item is accessed in the cache, its context tag is compared with the current context number and, if they are not equal, a "miss" signal is produced, indicating that the required data item is not present in the cache. This allows the cache to hold data relating to a number of different contexts, while avoiding the necessity for clearing the whole cache when the context is changed.

Normally, context numbers are allocated sequentially to programs when required. Eventually, however, all possible context numbers will have been allocated, and in this case it is necessary to "flush" the cache, to allow the context numbers to be used again for subsequent programs.

The usual technique for flushing a copy-back cache is to step through each data location in turn, and to copy back the contents of each modified location to the main memory. This ensures that the modified values are preserved in the main memory before the data in the cache is invalidated. However, this flushing procedure takes a relatively long time, and can result in an undesirable interruption on the operation of the system.

The object of the present invention is to overcome this problem.

SUMMARY OF THE INVENTION

According to the invention there is provided a data memory system comprising
(a) a main memory,
(b) a cache, having a plurality of locations, each location having a context tag,
(c) means for maintaining a current context number, having any one of a predetermined set of values,
(d) means for loading a data item from the main memory into a location of the cache, overwriting any data items already in that location, and setting the context tag of that location equal to the current context number, and
(e) means for copying back modified data items from the cache to the main memory when they are about to be overwritten in the cache, and
(f) means for setting all the context tags to a predetermined reserved value, not equal to any of said predetermined set of values.

It can be seen that re-setting the context tags effectively flushes the cache, since none of the context tags will match with the current context number. However, the data is still physically present in the cache, and modified items will eventually be copied back to the main memory before they are overwritten.

BRIEF DESCRIPTION OF THE DRAWINGS

A data processing system embodying a data memory system in accordance with the invention will now be described by way of example with reference to the accompanying drawings.

DESCRIPTION OF AN EMBODIMENT OF THE INVENTION

Figure 1:
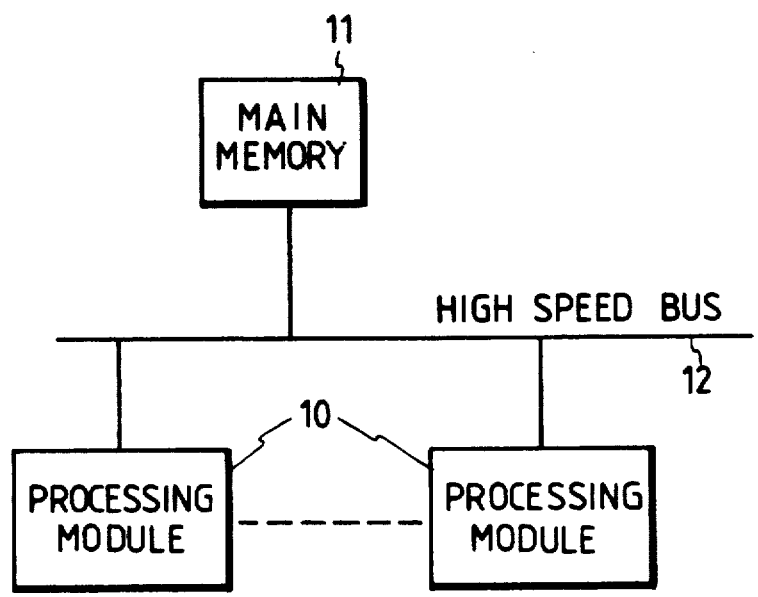
FIG. 1 is an overall block diagram of the data processing system.

Referring to FIG. 1, the data processing system comprises a plurality of data processing modules 10, and a main memory 11, interconnected by a high-speed bus 12.

In operation, any one of the processing modules 10 can acquire ownership of the bus for the purpose of initiating a bus transaction e.g. a read or write over the bus 12 to the memory module 11. Ownership of the bus is acquired by a bus arbitration scheme, details of which are not relevant to the present invention.

Figure 2:
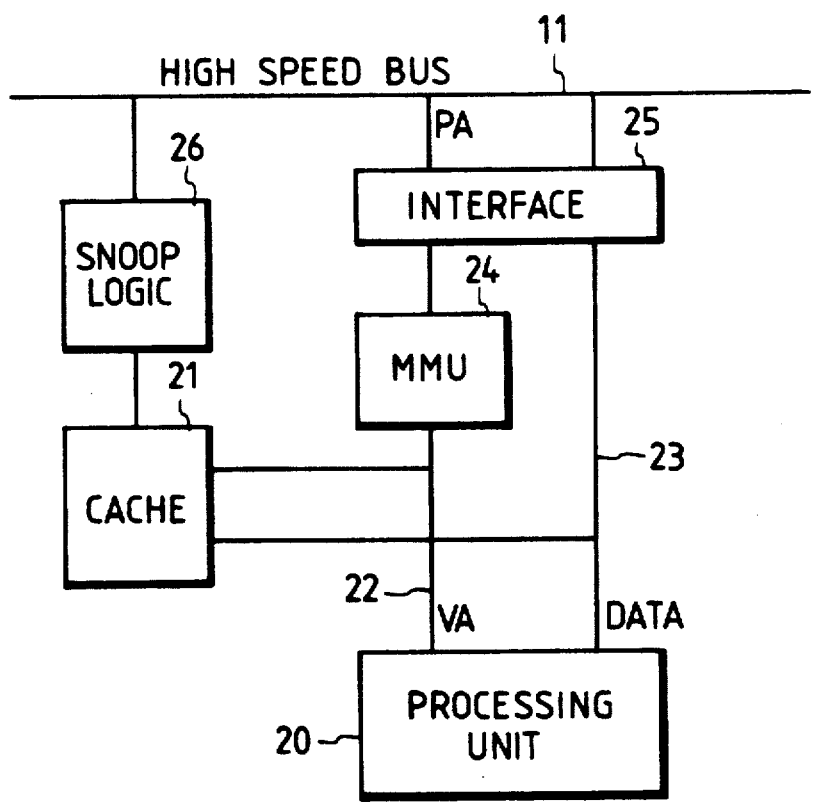
FIG. 2 is a block diagram of one of the processing modules of the system.

Referring now to FIG. 2, this shows one of the processing modules 10 in more detail.

The processing module comprises a processing unit 20, which may be a conventional microprocessor.

The processing module also includes a cache memory 21. This is a relative small, fast-access memory, compared with the main memory 11, and holds local copies of data items, for rapid access by the processing unit. In operation, when the processing unit requires to access a data item, for reading or writing, it generates the virtual address VA of the item, on an address path 22. The virtual address VA is applied to the cache 21. If the required data item is present in the cache, a HIT is indicated, allowing the processing unit to read or write the data item, by way of the data path 23.

If, on the other hand, the required data item is not present in the cache, it must be accessed from the main memory and loaded into the cache. The main memory is addressed by means of a physical address PA, which is derived from the virtual address VA by means of a memory management unit (MMU) 24. The physical address is sent over the bus 11 by way of an interface unit 25.

The processing module also includes a snoop logic unit 26 whose purpose is to ensure coherency between the contents of the cache 21 and the caches in the other processing modules. The snoop logic 26 is an associative memory which stores as tags the physical address of all the data currently resident in the cache 21. The snoop logic receives all the physical addresses appearing on the high speed bus from all the processing modules, and compares each received address with the stored physical address tags. If the received address matches any one of the stored physical addresses, the snoop logic generates the corresponding virtual address, and applies it to the cache 21 so as to access the corresponding line of data.

The operation of the snoop logic unit 26 will be described in more detail below with reference to FIG. 5.

Figure 3:
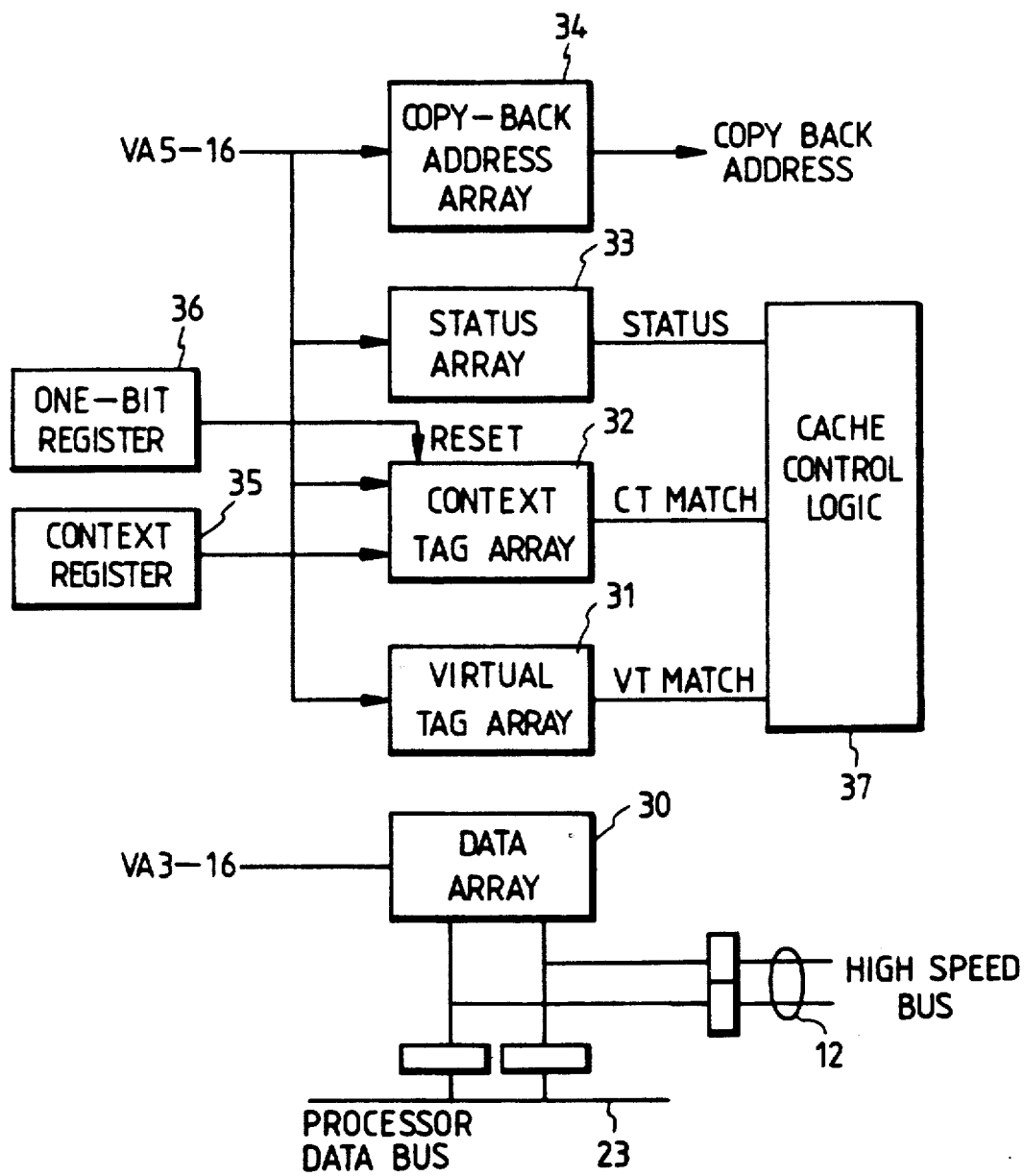
FIG. 3 is a block diagram of a cache memory forming part of each of the processing modules.

Referring now to FIG. 3, this shows the cache 21 in more detail.

In this figure, the virtual address VA is shown as consisting of the 32 bits VA 0-31, where VA0 is the least significant bit.

The cache 21 comprises a data array 30, which is a random-access memory (RAM) holding 16K double words, each double word consisting of 64 bits (8 bytes). The data array 30 is addressed by bits VA 3-16 of the virtual address, so as to access one double word. This double word can then be written or read, by way of the high speed bus 12, or the processor data path 23.

The data array is regarded as being organised into 4K lines of data, each line containing four double words (32 bytes). Bits VA 5-16 select one line of the cache, while bits VA 3-4 select one double word within this line.

The cache also comprises a virtual tag array 31, a context tag array 32, a status array 33, and a copy-back address array 34. Each of these arrays comprises a RAM, having 4K locations, one for each line of data in the cache. These arrays are all addressed in parallel by bits VA 5-16 of the virtual address, so that whenever a line of the data array is accessed, the corresponding location in each of the arrays 31-34 is also accessed.

The virtual tag array 31 holds a 15-bit virtual address tag for each line in the cache. Whenever a new line is loaded into the data array, bits VA 17-31 of its virtual address are written into the array 31 as the virtual address tag for that line. Correspondingly, whenever a line of data is accessed in the data array, its virtual address tag is compared with bits VA 17-31 of the virtual address. If they are equal, a VT MATCH signal is produced.

The context tag array 32 holds a 16-bit context tag for each line of the cache. The data input of this array is connected to a current context register 35. Whenever a new line is loaded into the cache, the contents of the register 35 are written into the currently addressed location of the array, as the context tag for this line, so that each line of data is tagged with the context number of the program to which it belongs. Correspondingly, whenever a line of data is accessed, its context tag is compared with the contents of the register 35. If they are equal, a CT MATCH signal is produced.

In this example, both the tag arrays 31 and 32 are constructed from JGS - THOMSON MK41H80 devices, which provide the necessary RAMs and also comparators for performing the above-mentioned comparisons.

The current context register 35 is accessible by the processing unit 20. Whenever the processing unit 20 initiates a new program, it allocates a 16-bit context number to that program. This context number can have any value, except hexadecimal FFFF (all ones), which is reserved as a null context number. Whenever the processing unit starts to execute a program to which a context number has been allocated, it loads that context number into the current context register 35.

Eventually, all possible context numbers will have been allocated by the processing unit. When this happens, it is necessary to flush the cache, so as to allow the context numbers to be recycled. This is done as follows. A single-bit register 36 is connected to a RESET input of the context tag array. When the processing unit requires to flush the cache, it resets the register 36, and this causes all the locations of the context tag array to be reset to the null value FFFF.( In practice, the tag RAMs are reset to the all-zero state, and the inverse value is used; that is, the current context tag is inverted before being compared). This achieves the desired flushing of the cache, since none of the lines in the cache will now have a context tag that matches the current context number. However, it should be noted that the data is still physically present in the cache, and will eventually be copied back to the main store, as will be described.

The status array 33 holds three status bits for each line of the cache. These indicate the state of the corresponding line, as follows.

| Status bits | State |
|---|---|
| 000 | INVALID |
| 001 | PRIVATE |
| 011 | MODIFIED |
| 101 | SHARED. |

PRIVATE means that the data in the line is not shared with any of the other processing modules, and that it has not been modified (updated) since it was loaded into the cache.

MODIFIED means that the data in the line is not shared, and that it has been modified. It is therefore the most up-to-date copy in the system of this data.

SHARED means that a copy of this data is also held in at least one other processing module, and that it has not been modified.

The outputs of the arrays 31-33 are all fed to a cache control logic unit 37, which controls the operation of the cache as will be described.

The copy-back address array holds a 19-bit physical address PA for each line in the cache. This indicates the physical address to which the line will eventually be copied back.

Figure 4:
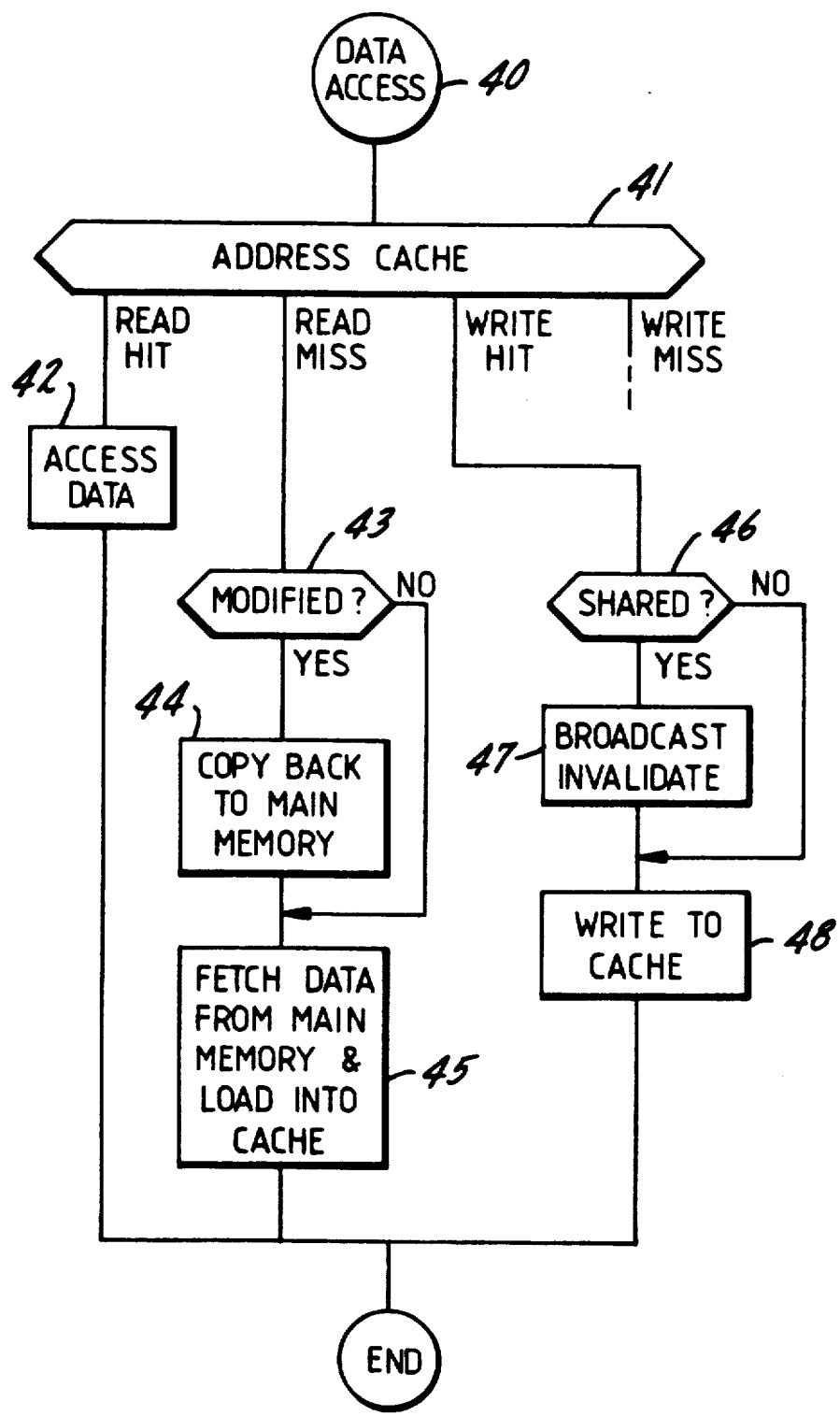
FIG. 4 is a flow chart illustrating the operation of the cache memory.

Referring now to FIG. 4, this illustrates the operation of the cache 21.

As mentioned above, whenever the processing unit 20 requires (box 40) to access a data item, it applies (box 41) the virtual address VA of the data to the cache 21, so as to access a line of the cache. If VT MATCH and CT MATCH are both true, and if the line is valid (i.e. the status bits are not equal to 000) then a HIT is scored, indicating that the required data item is present in the addressed line of the cache. Otherwise, a MISS is scored.

The operation of the cache depends on whether a HIT or a MISS is scored, and on whether this is a READ or WRITE operation, as follows.

(1) READ HIT. In this case, the data can be accessed (box 42) immediately from the cache. The status of the cache line is not changed.

(2) READ MISS. In this case, the required data must be fetched from the main store, and loaded into the cache, overwriting the existing line of the cache. If the existing line is in the MODIFIED state (box 43), it must first be copied back (box 44) to the main memory, so as to ensure that the most up-to-date copy of the data is preserved. This is achieved by means of a block write transaction over the high speed bus. The required data is then fetched (box 45) from the main memory by means of a block read transaction over the high speed bus, and loaded into the cache. The status of the new block is set either to SHARED or PRIVATE, according to whether or not this line is already present in the cache of another processing module, as indicated by a "shared" status line of the bus.

(3) WRITE HIT. If the current status of the cache line is PRIVATE, the data is written (box 48) into the cache, and the status is set to MODIFIED. If the status is already MODIFIED, the write proceeds without delay and there is no state change. If the cache line status is SHARED (box 46), then the physical address on the line is broadcast (box 47) over the bus to the other processing modules, so that they can invalidate the corresponding line in their caches, to ensure cache coherency. This is referred to as a broadcast invalidate operation. The data is written into the cache and the cache line status set to MODIFIED.

(4) WRITE MISS. In this case, the cache follows the sequence for read miss described above, followed by the sequence for write hit.

Figure 5:
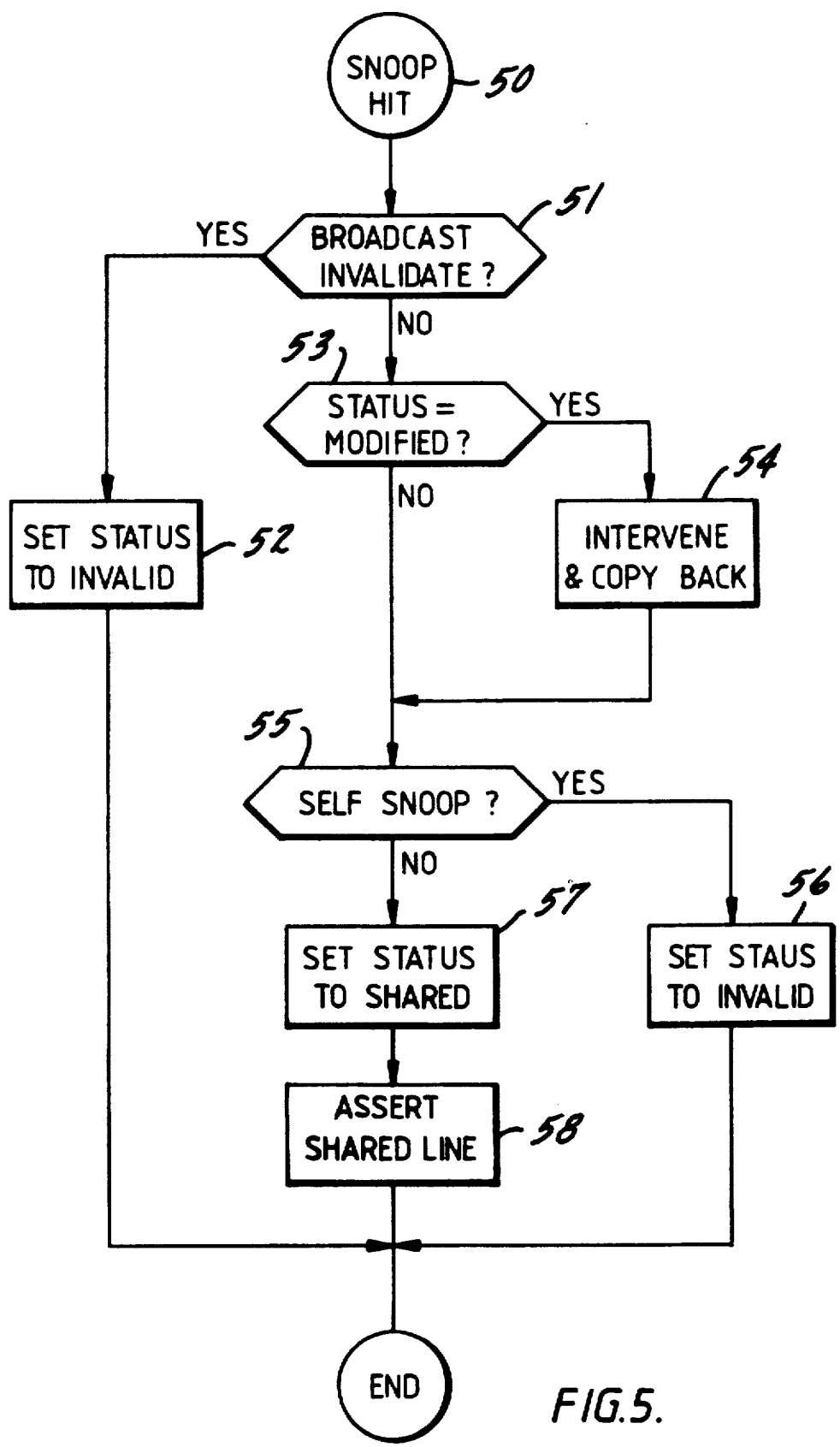
FIG. 5 is a flow chart illustrating the operation of a snoop logic unit forming part of each of the processing modules.

Referring now to FIG. 5, the operation of the snoop logic unit 23 is as follows. If the snoop logic detects a match (box 50) during a broadcast invalidate operation (box 51) by another processing module, it sets the status of the addressed cache line to INVALID (box 52). This ensures cache coherency.

If, on the other hand, the snoop logic detects a match during a block read transaction, instead of during a broadcast invalidate, it checks (box 53) the status of the data line in the cache 21. If the status of the cache line is MODIFIED, the snoop logic initiates an INTERVENTION operation (box 54). This casuses the block read transaction to be temporarily suspended, while the data line is copied back to the main memory. The block read transaction is then allowed to continue. This ensures that the most up-to-date copy of the data is available in the main memory for the block read transaction.

It should be noted that the snoop logic monitors block read transactions generated by all the processing modules, including the module in which the snoop logic is located. This latter possibility is referred to as a "self-snoop" operation, its purpose being to prevent the problem of synonyms in the cache. A synonym occurs where two or more virtual addresses map on to the same physical address, so that more than one copy of the same data item may be present in different locations of the cache.

If the cache hit resulted from a self-snoop operation (box 55), the status of the addressed line of the cache is set to INVALID (box 56). Thus, the existing copy of the data item in the cache is invalidated, preventing the occurrence of a synonym.

If, on the other hand, the cache hit resulted from a read transaction by another processing module, then the status of the addressed line of the cache is set to SHARED (box 57), and the shared status line of the bus is asserted (box 58), so as to inform the other module that the data in question is also present in the cache in this processing module.

In summary, it can be seen that the cache can be flushed simply by resetting all the context tags in the array 32 to the null value. This ensures that none of the existing data items in the cache can now be accessed by the processing unit, since none of them will produce a CT MATCH. However, the data items are still held in the cache, and modified items are eventually copied back to the main memory either when the line is overwritten as a result of a MISS, or as a result of an INTERVENTION operation.

We claim:

1. A data processing system comprising:
   (a) a main memory
   (b) a cache, having a plurality of locations, each location having a context tag, and a status indicator,
   (c) data processing means for executing a plurality of processes, and for allocating one of a predetermined set of values excluding a predetermined reserved value to each of the processes as a context number for that process,
   (d) context means coupled to said data processing means for storing a current context number equal to the context number of the process currently being executed by the data processing means,
   (e) loading means coupled to the main memory, the cache, and the context means for loading a data item from the main memory into a location of the cache, overwriting any data item already in that location, and setting the context tag of that location equal to the current context number,
   (f) setting means coupled to the cache for setting the status indicator of a location in the cache to indicate when a data item held in that location has been modified,
   (g) copyback means coupled to the main memory and the cache for copying back modified data items from the cache to the main memory when they are about to be overwritten in the cache, and
   (h) flushing means couple to the cache and the data processing means and operative when all of said predetermined set of values have been allocated, for setting all the context tags in the cache to said predetermined reserved value.

2. A data processing system according to claim 1, comprising a plurality of processing units, each with a separate cache, said main memory being shared between said processing units.

3. A data processing system according to claim 2, wherein each processing unit comprises a snoop logic unit for monitoring accesses to the main memory from the other processing units.

4. A data processing system according to claim 1, including means operative when a data location in the cache is accessed, for comparing the context tag of that location with the current context number and for indicating a cache miss if they are unequal.

5. A method of processing data comprising the steps of:
   (a) storing data items in a main memory and in a cache, the cache having a plurality of locations, each location having a context tag, and a status indicator,
   (b) executing a plurality of processes,
   (c) allocating one of a predetermined set of values to each of the processes as a context number for that process,
   (d) storing a current context number equal to the context number of the process currently being executed,
   (e) loading data items from the main memory into a location of the cache, overwriting any data items already in those locations, and setting the context tags of those locations equal to the current context number,
   (f) modifying selected data items in the cache and setting the status indicators of the cache locations to indicate which items have been modified,
   (g) copying back modified data items from the cache to the main memory when they are about to be overwritten in the cache, and
   (h) when all of said predetermined set of values have been allocated, resetting all the context tags in the cache to a predetermined reserved value not equal to any of said predetermined set of values.

* * * * *